H. COULSTON.
STOCKING DRYING MACHINE.
APPLICATION FILED MAY 2, 1918.

1,312,236.

Patented Aug. 5, 1919.
3 SHEETS—SHEET 1.

H. COULSTON.
STOCKING DRYING MACHINE.
APPLICATION FILED MAY 2, 1918.

1,312,236.

Patented Aug. 5, 1919.
3 SHEETS—SHEET 2.

Inventor;
Harry Coulston,
by his Attorneys,

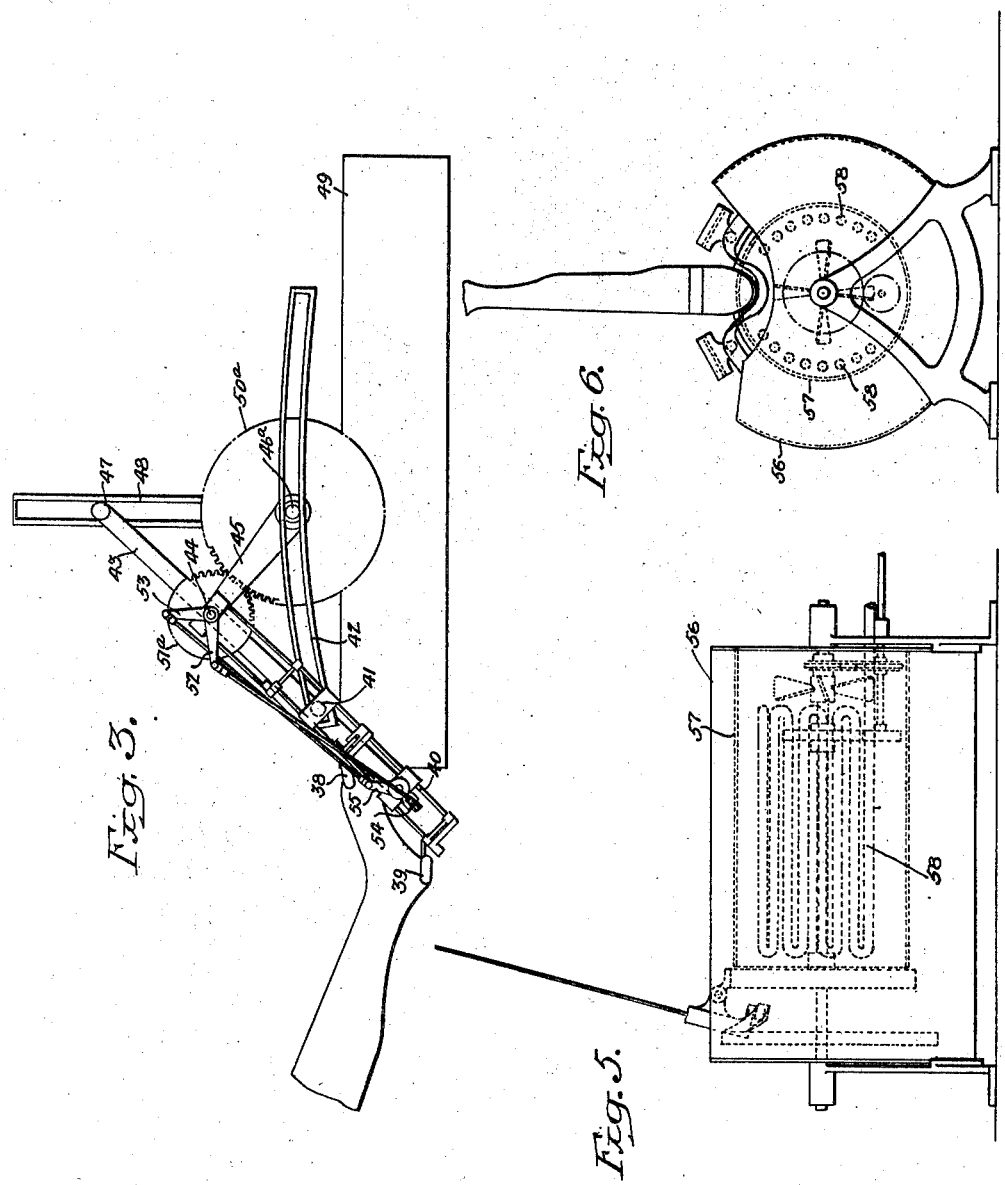

UNITED STATES PATENT OFFICE.

HARRY COULSTON, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

STOCKING-DRYING MACHINE.

1,312,236.           Specification of Letters Patent.      Patented Aug. 5, 1919.

Application filed May 2, 1918. Serial No. 232,082.

*To all whom it may concern:*

Be it known that I, HARRY COULSTON, a citizen of the United States, residing in Philadelphia, Pennsylvania, have invented certain Improvements in Stocking-Drying Machines, of which the following is a specification.

My invention relates to certain improvements in machines for drying stockings on forms.

One object of my invention is to provide a machine in which the stocking forms are rotated around an axle and in which one form at a time is presented to the operator for the purpose of placing a stocking thereon.

Another object of the invention is to provide means for automatically removing stockings from the forms.

A further object of the invention is to provide a machine which will occupy but a comparatively small space and in which the forms are presented automatically to the operator, a dried stocking having been previously removed from the form.

A still further object of the invention is to design the machine so that the hollow forms can be used in which steam is allowed to circulate, the operator remaining at a fixed station and the forms being traversed in front of him.

It will be understood that the machine is applicable for use in connection with steam heated forms, but it can be used with solid or perforated forms, using respectively external or internal heat.

In the accompanying drawings:

Fig. 3 is a plan view of a portion of Fig. 2, showing the means for removing the stockings from the forms;

Fig. 4 is a sectional view of one of the hollow forms showing the steam connections;

Fig. 5 is a side view of my improved machine provided with a casing in which heated air circulates; and Fig. 6 is an end view of the machine shown in Fig. 5.

Figure 1:
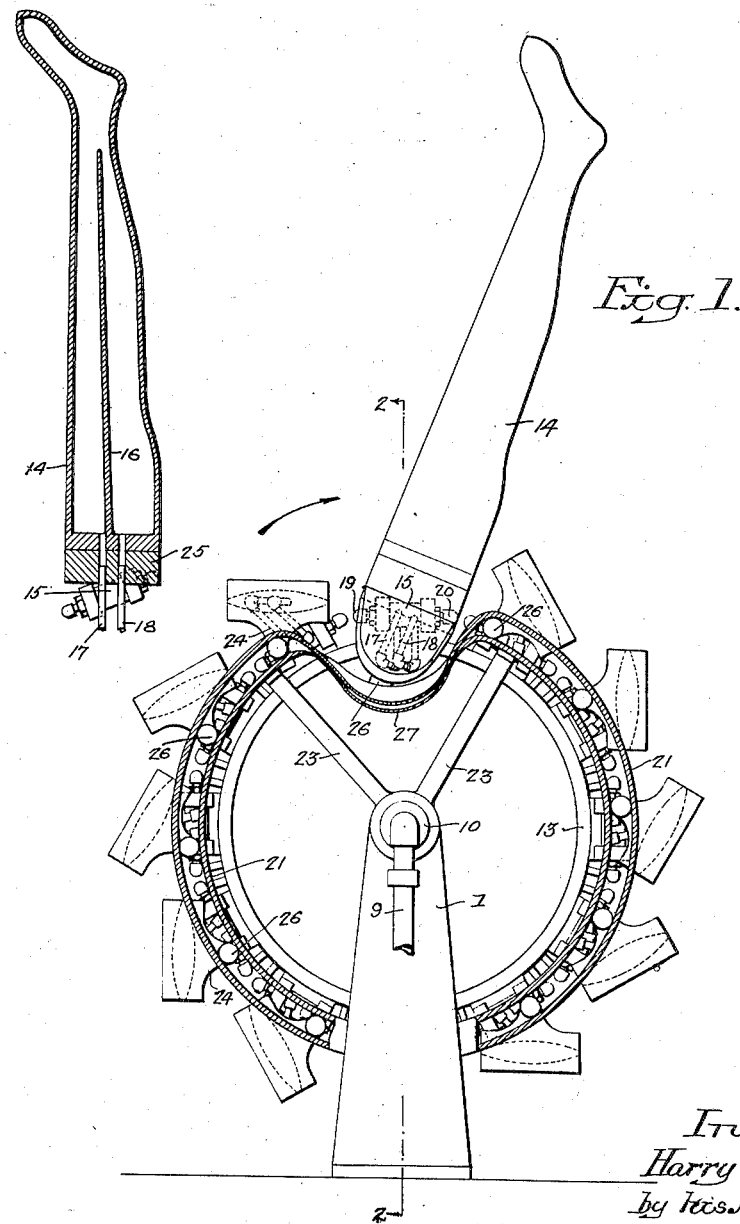
Figure 1 is a front view of my improved stocking drying machine, illustrated in connection with steam heated, hollow forms.

Referring to the drawings, 1 and 2 are standards having bearings for the longitudinal shaft 4, which is hollow and made in two sections 5 and 6. The section 5 is adapted to bearings in the standard 1. The two sections are flanged and coupled together by bolts 7 and between the two sections there is a diaphragm 8. 9 is a live steam pipe, which passes through a stuffing box 10 in the section 5 of the shaft so as to supply said section with steam. 11 is an exhaust pipe, which extends through a stuffing box 12 in the section 6 so as to allow for the escape of the steam after passing through the forms. Secured to the shaft 4 is a carrier 13 to which the forms 14 are pivoted at 15 so that they can assume either a horizontal or a vertical position. The forms 14 are made as shown in Fig. 4, being hollow and shaped to conform to the stocking, or other article of wearing apparel.

In the present instance, the form 14 has a longitudinal partition 16 so as to allow steam to circulate through the entire length of the form. 17 and 18 are steam pipes. One communicates with one side of the form and the other with the opposite side and these pipes also communicate with the trunnions or pivot 15 for the stocking form. 19 is a steam supply pipe which enters the stuffing box in the end of the trunnion and communicates with the same space as the pipe 17, while the pipe 20 forms communication between the space 6 of the shaft 4 and the other side of the trunnion, entering the trunnion through the end, as clearly shown in Fig. 2, so that by this means steam will freely circulate through the several forms, and these forms can be turned on their pivots without interferring with the free flow of the steam.

Figure 2:
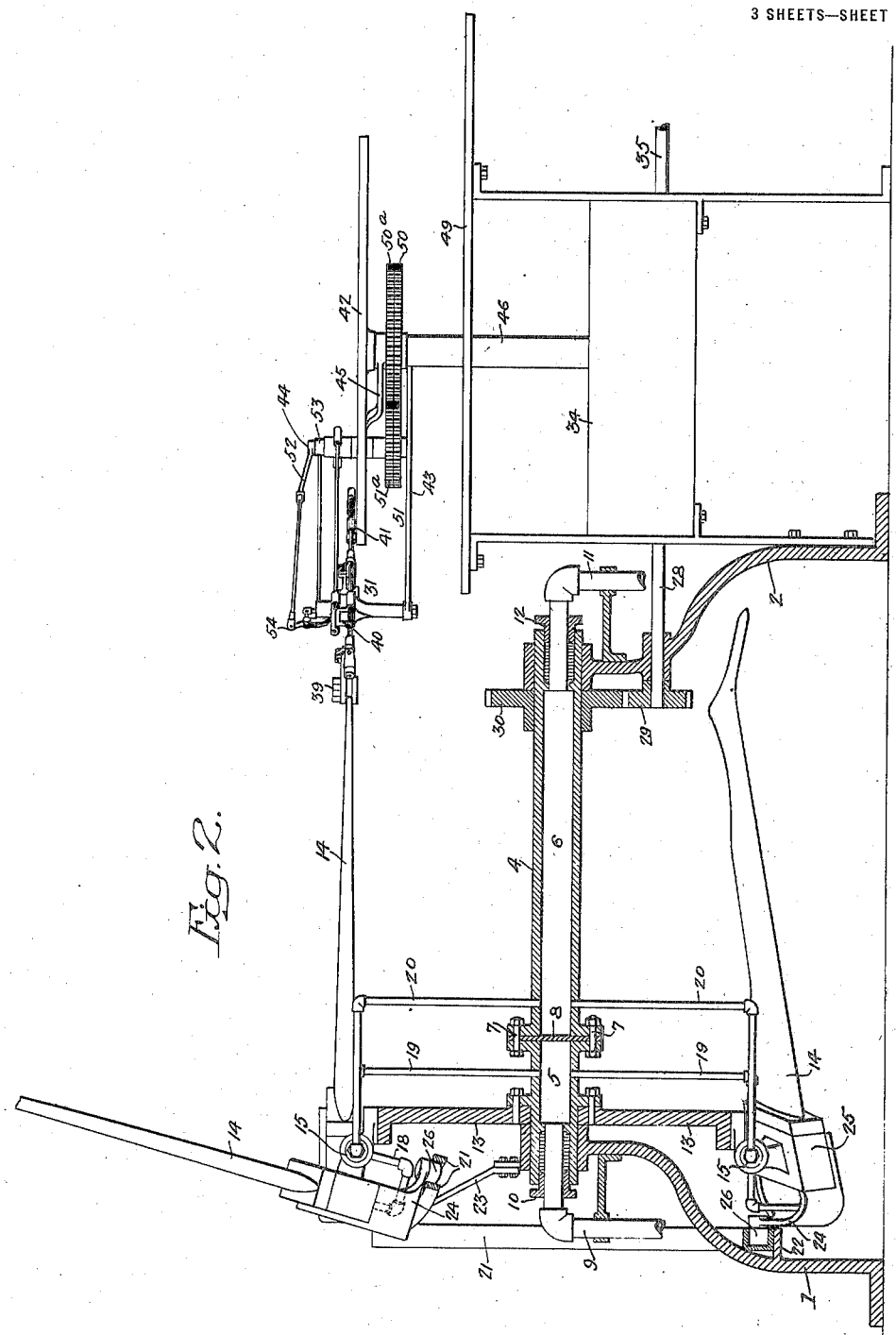
Fig. 2 is a longitudinal sectional view on the line 2—2, Fig. 1, showing only the upper and the lower forms, the forms in the distance being omitted to avoid confusion.

In order to control automatically the movement of the stocking forms on their pivots, I provide an annular cam 21, in the present instance, which is supported by a bracket 22 in the lower end and diagonal braces 23 at the upper end. This cam has an annular groove and on a bracket 24 projecting from the base 25 of each stocking form is a roller 26, which travels in the groove of the cam. The upper end of the cam is depressed, as at 27, and is shaped so as to turn a stocking form on its pivot to a position almost vertical, in the present instance, as shown in Figs. 1 and 2, and directly in front of the operator so that he can readily place a stocking to be dried on the form. The remainder of the cam is concentric so as to retain the forms in a horizontal position as they are rotated.

The driving mechanism of the machine is so designed that a stocking will be completely dried in one revolution of the carrier. In the present instance, the shaft 28 is an intermittently operated driving shaft mounted in a bearing in the standard 2, and on one end of this shaft is a pinion 29, which meshes with a gear wheel 30 on the shaft 4. Other means of driving may be resorted to without departing from the essential features of the invention.

In order to remove the stockings quickly and accurately from the forms, I employ the automatic stocking removing device shown at 31. This stocking removing device is substantially the same as that of the patent granted on the 26th day of January, 1915, No. 1,126,619, with the exception that mechanism is provided for moving the device on a substantially longitudinal line from the form to remove the stocking, while the form is stationary. The grippers 38 and 39, and the mechanism for operating them, are substantially similar to that in the above mentioned patent. The carrier 40 for the grippers has a roller 41 adapted to a curved guide rail 42. The carrier 40 is pivoted about midway between the grippers to an arm 43, pivoted at 44 to an arm 45, secured to a driven shaft 46. The outer end of the arm 43 has a roller 47, which is arranged to travel in a fixed guide rail 48 so that, when the grippers engage the stocking, the carrier is moved away from the form, first pulling more on the heel, then on the toe, so as to relieve the stocking, then gradually removing the stocking until it is entirely withdrawn from the form and rests on a table 49, or other support. The mechanism for actuating the grippers is driven from gear wheels 50, 50ª, on the shafts 46, 46ª, respectively, which mesh with gear wheels 51, 51ª, on the pivot 44 of the lever 43, and on the gear wheel 51 is an arm 52 connected by a rod to an arm 54 on the grippers, and on the gear wheel 51ª is an arm 53 connected by a rod to an arm 55, also on the grippers. The parts are so controlled that when the form, with the stockings thereon, comes in position, the grippers are open to receive the edge of the form and the stocking, and when the form comes to a rest, due to the intermittent movement of the parts, the grippers close on the heel and toe of the stocking, then the carrier is moved so as to withdraw the form from the stocking.

The shafts 46, 46ª extend into a gear box 34 which contains the gearing to give the proper movement to the said shafts from the driven shaft 35 which extends into the box and is driven from the main shaft 38.

I have only shown one means of connecting the grippers with the driving mechanism, but it will be understood that other means may be provided without departing from the spirit of the invention.

In some instances, I may inclose the machine in a casing so as not only to protect the stockings, but also to retain the heat.

In Figs. 5 and 6, I have illustrated a modification of my invention in which a casing 56 incloses the greater portion of the machine and in this casing is a partition 57. Steam pipes 58 are located in the casing so as to provide heat. 59 is a circulating fan which may be located at any position desired for causing the circulation of hot air in the casing. Thus hollow, heated forms may be used, as illustrated in Figs. 1 and 2, or, as shown in Figs. 5 and 6, the forms may be solid and the stockings dried by the circulated hot air, or perforated forms may be used in which hot air is allowed to pass for the purpose of drying the stockings. The casing is discontinued at the top and suitable shutters may be provided for allowing the stocking forms, with the stockings thereon, to move into the casing and to move out of the casing so that the automatic mechanism for removing the stockings from the forms can be applied to the forms, and also to allow for the movement of the forms from the horizontal to the vertical position.

While the machine is particularly adapted for use in drying stockings and for automatically removing stockings from the forms, in some instances the machine may be designed so as to allow the operator sufficient time to remove a stocking from the form and to place another stocking thereon before the form is moved from the vertical to the horizontal position. It will also be understood that the machine is intermittently operated and the dwell can be of any length desired so as to give the operator sufficient time to manipulate the stocking.

I preferably employ union couplings between the steam pipes which extend from the hollow shafts to the forms, so that a form of one size can be removed and a form of another size can be substituted for it by simply uncoupling the unions and removing the pivot pins.

It will be seen by the above described mechanism that I am enabled to provide a machine in which the operator can remain at a fixed station and can place stockings on the forms with care so as to crease the same properly. The stockings will be automatically carried to a point where they are engaged automatically by the removing mechanism, which removes the stockings in such a manner that they can be placed on a table, or on a conveyer and one stocking can be placed on another until there are a certain number of stockings in the pile, after which the pile can be removed, obviating the tedious part of the stocking drying work, viz., removing each stocking by hand, then flattening it out on a pile and counting the stockings in each pile.

I claim:

1. The combination in a stocking drying machine, of a cylindrical carrier; a series of forms pivotally mounted on the periphery of the carrier; means for rotating the carrier; and means for drying the stockings while on the forms.

2. The combination in a stocking drier, of a carrier; a series of hollow forms pivotally mounted on the carrier; means for rotating the carrier; means for moving one of the elements into position in front of the operator so that a stocking can be placed thereon; and means for drying the stockings while on the forms.

3. A rotating carrier; a series of forms mounted on the carrier; means for rotating the carrier; and means for automatically removing the stockings from the forms as they pass a given point.

4. The combination of a carrier; a series of hollow, steam heated forms mounted on the carrier; means for rotating the carrier; and means for causing each form, as it reaches a given point, to assume a position in front of the operator so that a stocking can be placed on the form.

5. The combination of a carrier; a series of forms mounted on the carrier; means for rotating the carrier; means for causing each form, as it reaches a given point, to asume a position in front of the operator so that a stocking can be placed on the form; and means so located as to remove a stocking from the form prior to its being moved into a position to receive another stocking.

6. The combination in a machine for drying stockings, of standards; a horizontal shaft having bearings in the standards; means for rotating the shaft, said shaft being hollow and made in two sections; a live steam pipe communicating with one section; an exhaust steam pipe communicating with the other section; a carrier mounted on the shaft; a series of forms pivotally mounted on the carrier, said forms being hollow; and pipes connecting one section of the shaft with one side of each form, and pipes forming communication between the other side of the shaft and the other side of the form so that, as the forms are rotated, steam will circulate through them.

7. The combination of standards; a horizontal shaft mounted in the standards; a carrier mounted on the shaft; means for turning the shaft; a series of forms pivotally mounted on the carrier; a cam for raising the forms at a given point so as to allow the operator to place a stocking on the form; and means for heating the forms.

8. The combination in a machine for drying stockings, of standards; a horizontal shaft mounted in the standards; means for driving the shaft; pivoted forms on the standards, each form having a roller; an annular cam on which the roller travels, said cam having a depressed portion at one point so as to cause the form to be elevated to allow the operator to place a stocking on the form.

9. The combination of a horizontal shaft; bearings therefor; a carrier secured to the shaft; a driving shaft; gearing between the driving shaft and the horizontal shaft; a series of hollow forms pivoted to the carrier at its periphery; a cam for controlling the position of the carriers so that while they are being turned they are in a horizontal position, the cam being depressed at a given point so as to raise the forms in succession to allow the operator to place stockings on the forms; and automatic means for removing the stockings from the forms; and gearing between the main shaft and said automatic means so that the mechanism will be driven in unison.

10. The combination of a moving carrier; stocking forms mounted thereon; a pair of grippers and a carrier for the grippers; a guide rail for guiding the carrier; a rotating shaft; an arm pivoted to the grip carrier and a rail for guiding the outer end of the arm; and an arm connecting the rotating shaft with the first mentioned arm so that, when said arm is moved in the segment of a circle it will cause the gripping device to draw a stocking off of a form.

In witness whereof I affix my signature.

HARRY COULSTON.